United States Patent
Kovacs

(10) Patent No.: US 10,409,023 B2
(45) Date of Patent: Sep. 10, 2019

(54) LASER ALIGNMENT SYSTEMS

(71) Applicant: Sensors Unlimited, Inc., Princeton, NJ (US)

(72) Inventor: Laszlo Kovacs, Whitehouse Station, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 334 days.

(21) Appl. No.: 15/258,896

(22) Filed: Sep. 7, 2016

(65) Prior Publication Data

US 2018/0066793 A1 Mar. 8, 2018

(51) Int. Cl.
G02B 7/02 (2006.01)
G02B 7/00 (2006.01)
H01S 3/02 (2006.01)
H01S 3/00 (2006.01)

(52) U.S. Cl.
CPC ............. *G02B 7/023* (2013.01); *G02B 7/004* (2013.01); *H01S 3/0071* (2013.01); *H01S 3/02* (2013.01)

(58) Field of Classification Search
CPC ...... B23K 26/035; B23K 26/02; B23K 26/00; G01B 11/27; G02B 6/4226; G02B 7/004; Y10S 248/913
See application file for complete search history.

(56) References Cited

U.S. PATENT DOCUMENTS

| | | | | |
|---|---|---|---|---|
| 4,077,722 A | * | 3/1978 | Bicskei | B23Q 17/22 248/913 |
| 4,126,376 A | * | 11/1978 | Gommel | G02B 21/32 356/399 |
| 4,161,068 A | * | 7/1979 | McMaster | G01B 11/27 33/412 |
| 4,298,281 A | * | 11/1981 | Schave | G01B 11/27 356/138 |
| 4,764,983 A | * | 8/1988 | Walter | H04B 10/50 372/107 |
| 4,772,109 A | * | 9/1988 | Cutburth | G02B 7/004 108/137 |
| 4,907,881 A | * | 3/1990 | Jones | G01B 11/272 33/263 |
| 5,029,791 A | * | 7/1991 | Ceccon | G02B 6/4226 248/287.1 |
| 5,061,039 A | * | 10/1991 | Cassidy | G02B 7/004 269/73 |
| 5,208,888 A | * | 5/1993 | Steinblatt | G02B 6/4226 385/90 |
| 5,531,040 A | | 7/1996 | Moore | |

(Continued)

FOREIGN PATENT DOCUMENTS

CN 104014930 A 9/2014

*Primary Examiner* — Tyrone V Hall, Jr.
(74) *Attorney, Agent, or Firm* — Locke Lord LLP; Daniel J. Fiorello; Joshua L. Jones

(57) ABSTRACT

A laser alignment arrangement includes a first stage configured to structurally support a laser at a first longitudinal position of the laser, the first stage being configured to adjust the first longitudinal position of the laser in at least one direction orthogonal to an axis of the laser, and a second stage configured to structurally support the laser at a second longitudinal position of the laser, the second stage being configured to adjust the second longitudinal position of the laser in at least one direction orthogonal to the axis of the laser.

13 Claims, 7 Drawing Sheets

(56) References Cited

U.S. PATENT DOCUMENTS 5,956,190 A * 9/1999 Sieg ................. G02B 23/16
                                                      359/827
2016/0306133 A1* 10/2016 Lotz ................. G01B 5/0004

* cited by examiner

LASER ALIGNMENT SYSTEMS

BACKGROUND

1. Field

The present disclosure relates to laser systems, more specifically to laser alignment systems.

2. Description of Related Art

Certain applications of laser (e.g., for optical systems) require light to be aligned through one or more aperture and to center on a target. Traditional alignment stages are designed for centering the laser to a target but not to align through one or more apertures and also center to the target.

Such conventional methods and systems have generally been considered satisfactory for their intended purpose. However, there is still a need in the art for improved laser alignment systems. The present disclosure provides a solution for this need.

SUMMARY

In accordance with at least one aspect of this disclosure, a laser alignment arrangement includes a first stage configured to structurally support a laser at a first longitudinal position of the laser, the first stage being configured to adjust the first longitudinal position of the laser in at least one direction orthogonal to an axis of the laser, and a second stage configured to structurally support the laser at a second longitudinal position of the laser, the second stage being configured to adjust the second longitudinal position of the laser in at least one direction orthogonal to the axis of the laser. In certain embodiments, the first stage can be configured to adjust the first longitudinal position of the laser in two directions orthogonal to the axis of the laser, and the second stage can be configured to adjust the second longitudinal position of the laser in two directions orthogonal to the axis of the laser.

The arrangement can include a support frame and a first stage fixed to the support frame and configured to receive a first portion of a laser. The first stage can be configured to move the first portion of the laser in at least one direction. The arrangement can also include a second stage fixed to the support frame and configured to receive a second portion of the laser. The second stage can be configured to move the second portion of the laser in at least one direction relative to the first stage.

At least one of the first stage and the second stage can include a fixed housing that is fixed relative to the support frame and a moveable housing that is configured to move relative to the fixed housing, the moveable housing including a laser opening configured to receive the laser. The arrangement can include at least one spring element disposed on the fixed housing or the moveable housing to bias the moveable housing against an adjustment mechanism. The adjustment mechanism can include at least one adjustment screw mounted to the fixed housing and configured to move relative to the fixed housing to push on the moveable housing.

The at least one spring element can include at least one spring element for each adjustment screw disposed on the fixed housing or the moveable housing on an opposite side thereof relative to each adjustment screw. The at least one spring element for each adjustment screw can include at least two spring elements for each adjustment screw disposed on the fixed housing or the moveable housing on an opposite side thereof relative to each adjustment screw.

The first stage and the second stage can be configured to move the first portion and the second portion of the laser in two axes. At least one of the first stage or the second stage can further include a swivel yoke defining a laser opening and configured to receive the laser, the swivel yoke configured to allow articulation of the laser to prevent laser stressing between the first stage and the second stage. The swivel yoke can include a semispherical shape and is mounted to the moveable housing via a yoke coupling assembly.

The yoke coupling assembly can include one or more O-rings retained between the swivel yoke and the moveable housing. In certain embodiments, the one or more O-rings can be made of Teflon, however, any other suitable material is contemplated herein.

The swivel yoke can include an aperture and at least one laser O-ring disposed in the aperture for interfacing with and frictionally retaining the laser. The laser O-ring can be made of silicone or any other suitable material.

In certain embodiments, the first stage and the second stage can be separated by one or more spacers. The arrangement can further include the laser.

A method for aligning a laser includes moving a first portion of a laser in at least one direction in a first stage, and moving a second portion of the laser in at least one direction in a second stage. In certain embodiments, the method includes moving a first longitudinal position of a laser in at least one direction orthogonal to an axis of the laser and moving a second longitudinal position of the laser in at least one direction orthogonal to the axis of the laser. The method can further include allowing the laser to swivel within at least one of the first stage or the second stage.

The method can include inserting the laser into a first stage and second stage of a laser alignment arrangement by sliding the laser into a laser opening of the first stage and the second stage. The method can further include moving the first longitudinal position of the laser in two directions orthogonal to an axis of the laser, and moving the second longitudinal position of the laser in two directions orthogonal to the axis of the laser.

In accordance with at least one aspect of this disclosure, a laser alignment system includes a support frame and a first stage fixed to the support frame and configured to receive a first portion of a laser. The first stage is configured to move the first portion of the laser in at least one direction. The system also includes a second stage fixed to the support frame and configured to receive a second portion of the laser. The second stage is configured to move the second portion of the laser in at least one direction relative to the first stage.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
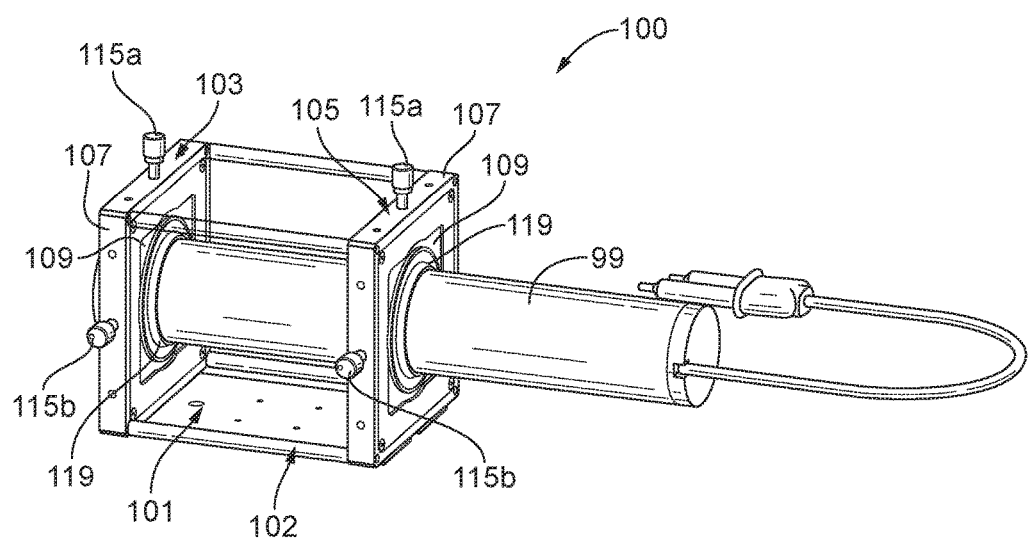
FIG. 1 is a perspective view of an embodiment of an arrangement in accordance with this disclosure, showing a laser disposed therein.

Reference will now be made to the drawings wherein like reference numerals identify similar structural features or aspects of the subject disclosure. For purposes of explanation and illustration, and not limitation, an illustrative view of an embodiment of an arrangement in accordance with the disclosure is shown in FIG. 1 and is designated generally by reference character 100. Other embodiments and/or aspects of this disclosure are shown in FIGS. 2-6. The systems and methods described herein can be used to align a laser beam from a laser for any suitable application (e.g., optical systems).

Referring to FIG. 1, a laser alignment arrangement 100 includes a first stage 103 configured to structurally support a laser 99 at a first longitudinal position of the laser 99. The first stage 103 can be configured to adjust the first longitudinal position of the laser 99 in at least one direction orthogonal to an axis of the laser 99. The arrangement 100 can include a second stage 105 configured to structurally support the laser 99 at a second longitudinal position of the laser 99, the second stage 105 being configured to adjust the second longitudinal position of the laser 99 in at least one direction orthogonal to the axis of the laser 99.

In certain embodiments, the first stage 103 can be configured to adjust the first longitudinal position of the laser 99 in two directions orthogonal to the axis of the laser 99. In certain embodiments, the second stage 105 can be configured to adjust the second longitudinal position of the laser 99 in two directions orthogonal to the axis of the laser 99. The arrangement 100 can include a support frame 101 (e.g., a plate or any other suitable shape). As shown, the first stage 103 can be fixed to the support frame 101 and configured to receive a first portion (e.g., a front portion) of a laser 99 (e.g., a laser diode or any other suitable laser assembly). The first stage 103 can be configured to move the first portion of the laser 99 in at least one direction (e.g., two directions as shown in FIG. 1). The second stage 105 can be fixed to the support frame 101 and configured to receive a second portion (e.g., a more rear portion than the first portion) of the laser 99. The second stage 105 can be configured to move the second portion of the laser 99 in at least one direction relative to the first stage 103 (e.g., in two directions as shown in FIG. 1). In certain embodiments, the first stage 103 and the second stage 105 can be the same as shown, or can be different in any suitable manner.

In certain embodiments, the first stage 103 and the second stage 105 can be separated by one or more spacers 102. The arrangement 100 can further include the laser 99.

Figure 2:
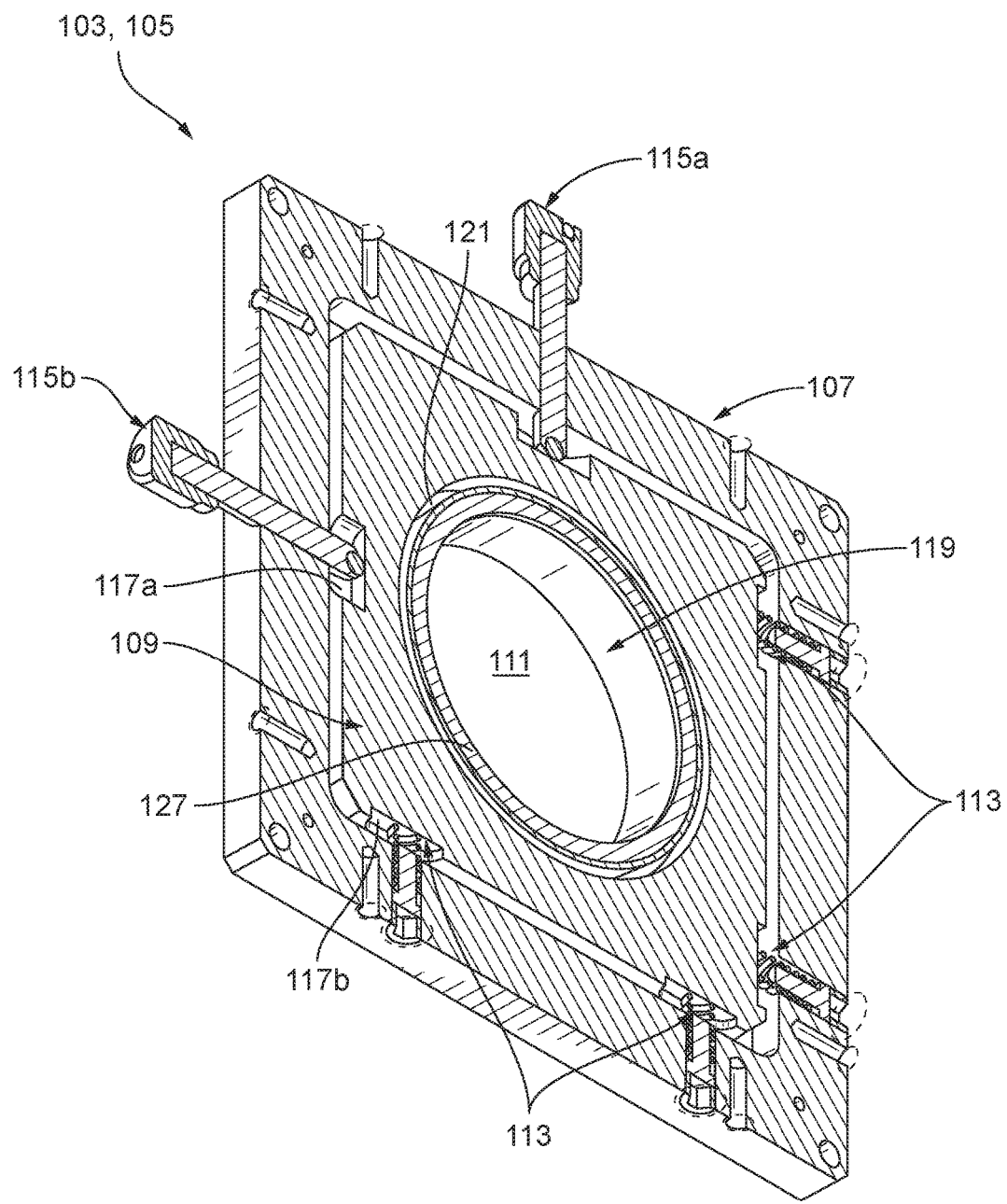
FIG. 2 is a cross-sectional view of a stage of the arrangement of FIG. 1, shown without the laser.

Referring additionally to FIG. 2, at least one of the first stage 103 and the second stage 105 can include a fixed housing 107 that is fixed relative to the support frame 101 and a moveable housing 109 that is configured to move relative to the fixed housing 107. The moveable housing 109 and/or the fixed housing 107 can include any suitable shape and/or dimensions (e.g., plate shaped). The moveable housing 109 can include a laser opening 111 configured to receive the laser 99. In certain embodiments, at least one spring element 113 disposed on the fixed housing 107 or the moveable housing 109 to bias the moveable housing 109 against an adjustment mechanism. The adjustment mechanism can include at least one adjustment screw 115a, 115b mounted to the fixed housing 107 and configured to move relative to the fixed housing 107 to push on the moveable housing 109. For example, as shown, each stage 103, 105 can include a vertical adjustment screw 115a and a horizontal adjustment screw 115b which allow two orthoganal axes of control.

The at least one spring element 113 can include at least one spring element for each adjustment screw 115a, 115b disposed on the fixed housing 107 or the moveable housing 109 on an opposite side thereof relative to each adjustment screw 115a, 115b. As shown, the at least one spring element 113 for each adjustment screw 115a, 115b can include at least two spring elements 113 for each adjustment screw 115a, 115b disposed on the fixed housing 107 or the moveable housing 109 on an opposite side thereof relative to each adjustment screw 115a, 115b. This can aid stability of the movable housing 109, for example.

The movable housing 109 can define one or more screw channels 117a and/or spring channels 117b shaped to receive, retain, and/or guide the one or more adjustment screws 115a, 115b and/or the one or more spring elements 113. The channels 117a, 117b can include any suitable shape and/or size. As shown, both the first stage 103 and the second stage 105 can be configured to move the first portion and the second portion of the laser 99 in two axes.

Figure 3:
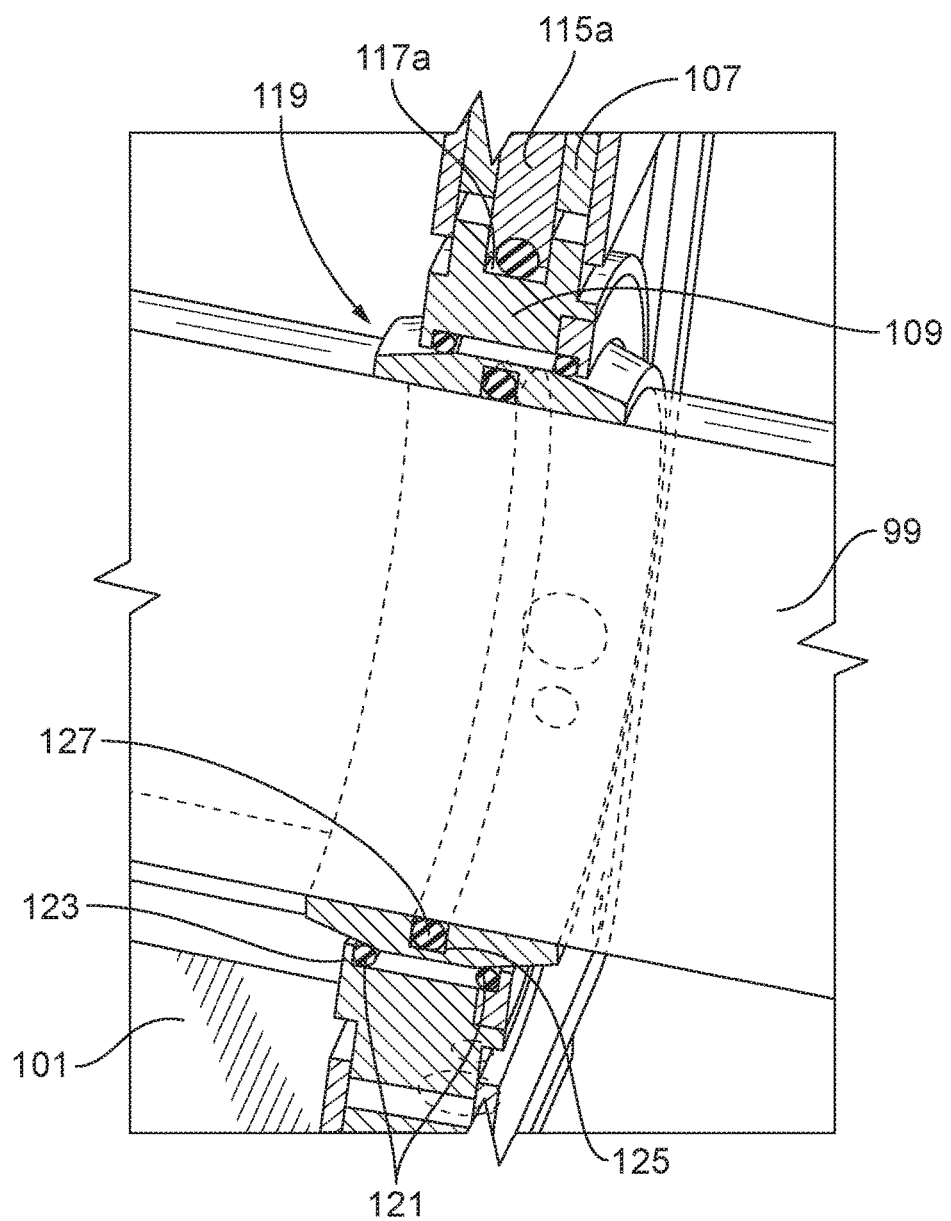
FIG. 3 is a cross-sectional view of a stage of the arrangement of FIG. 1, shown with the laser disposed therein in phantom.

In certain embodiments, referring additionally to FIG. 3, at least one of the first stage 103 or the second stage 105 can further include a swivel yoke 119 defining the laser opening 111 and configured to receive the laser 99. The swivel yoke 119 can be configured to allow articulation of the laser 99 to prevent laser stressing between the first stage 103 and the second stage 105 (e.g., due to a difference in position of each laser opening 111. The swivel yoke 111 can include a semispherical shape and/or any other suitable shape. The swivel yoke 119 can be mounted to the moveable housing 109 via a yoke coupling assembly or in any other suitable manner.

The yoke coupling assembly can include one or more O-rings 121 retained between the swivel yoke and the moveable housing 109. For example, the one or more O-rings 121 can be retained by the interaction of the swivel yoke 119 and one or more flanges 123 of the movable housing 109. Also, as shown, in certain embodiments, a yoke cap 125 can be received by the movable housing 109 to complete the yoke coupling assembly and retain the one or more O-rings 121. In certain embodiments, the one or more O-rings 121 can be made of Teflon, however, any other suitable material is contemplated herein.

The swivel yoke 119 can include an aperture 125 and at least one laser O-ring 127 disposed in the aperture 125 for interfacing with and frictionally retaining the laser 99. The laser O-ring 125 can be made of silicone and/or any other suitable material.

Figure 4A:
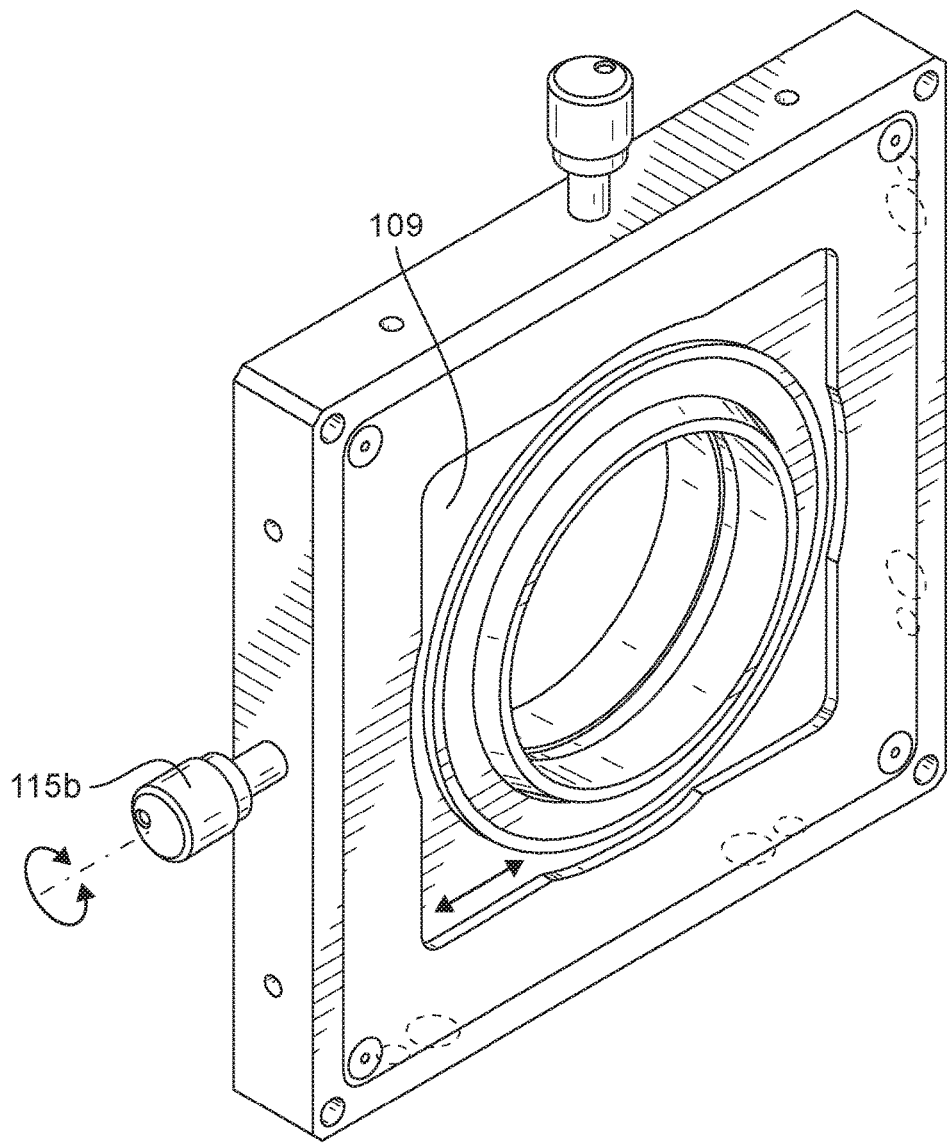
FIG. 4A is a perspective view of a stage of the arrangement of FIG. 1, shown schematically with directional arrows indicating direction of motion of the movable housing relative to a direction of rotation of a horizontal adjustment screw.
Figure 4B:
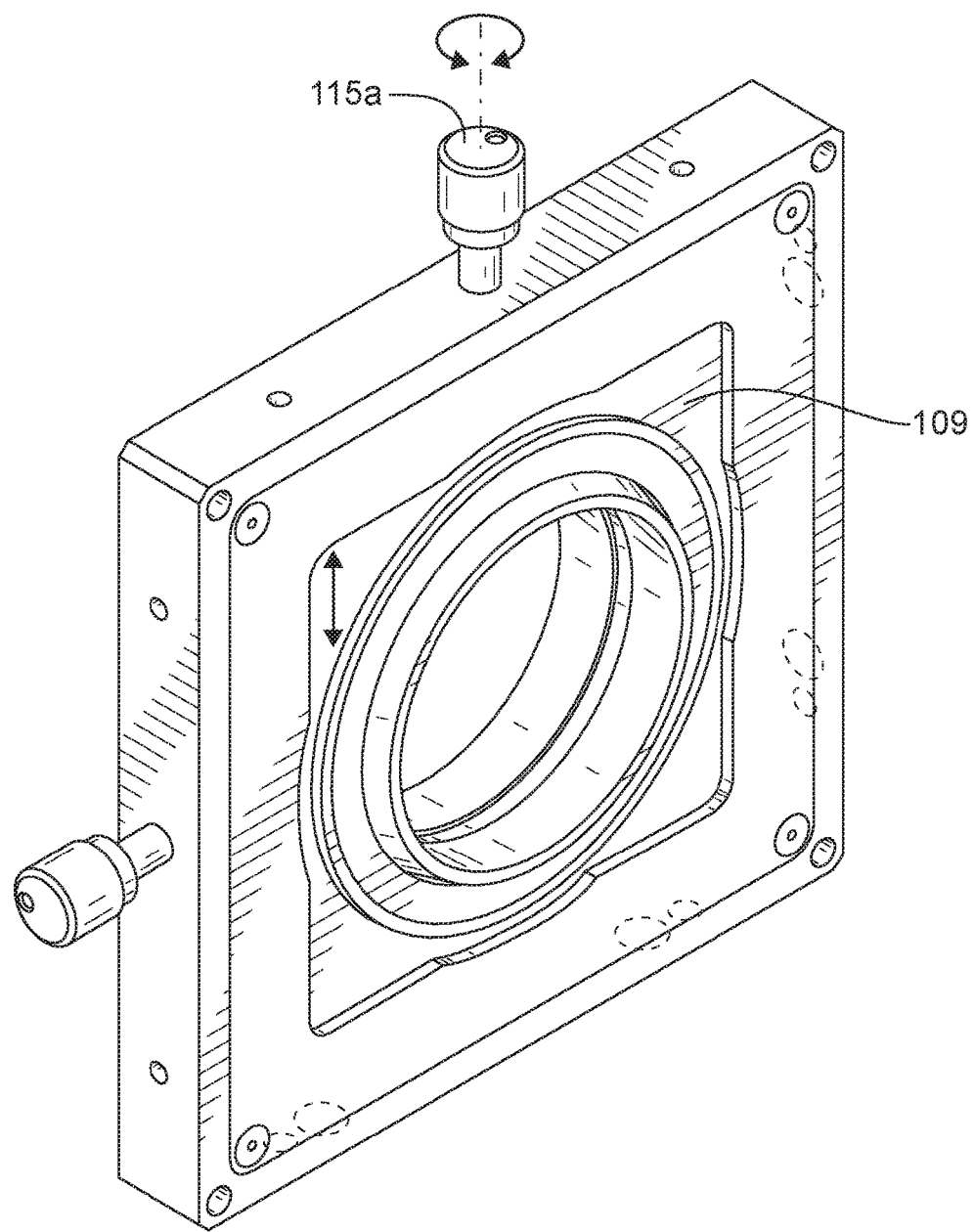
FIG. 4B is a perspective view of a stage of the arrangement of FIG. 1, shown schematically with directional arrows indicating direction of motion of the movable housing relative to a direction of rotation of a vertical adjustment screw.

Referring to FIG. 4A, a perspective view of a stage 103, 105 is shown schematically with directional arrows indicating direction of motion of the movable housing 109 relative to a direction of rotation of a horizontal adjustment screw 115b. FIG. 4B shows a perspective view of a stage 103, 105 schematically with directional arrows indicating direction of motion of the movable housing 109 relative to a direction of rotation of a vertical adjustment screw 115a. The spring elements 113 resist motion and provide a resorting force to push the movable housing 109 back toward the adjustment screws 115a, 115b when the adjustment screws 115a, 115b are withdrawn.

A method for aligning a laser includes moving a first portion of a laser 99 in at least one direction in a first stage 103, and moving a second portion of the laser 99 in at least one direction in a second stage 105. In certain embodiments, the method includes moving a first longitudinal position of a laser 99 in at least one direction orthogonal to an axis of the laser 99 and moving a second longitudinal position of the laser 99 in at least one direction orthogonal to the axis of the laser 99. The method can further include allowing the laser 99 to swivel within at least one of the first stage 103 or the second stage 105.

The method can include inserting the laser 99 into a first stage 103 and second stage 103 of a laser alignment arrangement 100 by sliding the laser 99 into a laser opening 111 of the first stage 103 and the second stage 105. The method can further include moving the first longitudinal position of the laser in two directions orthogonal to an axis of the laser, and moving the second longitudinal position of the laser in two directions orthogonal to the axis of the laser.

Figure 5:
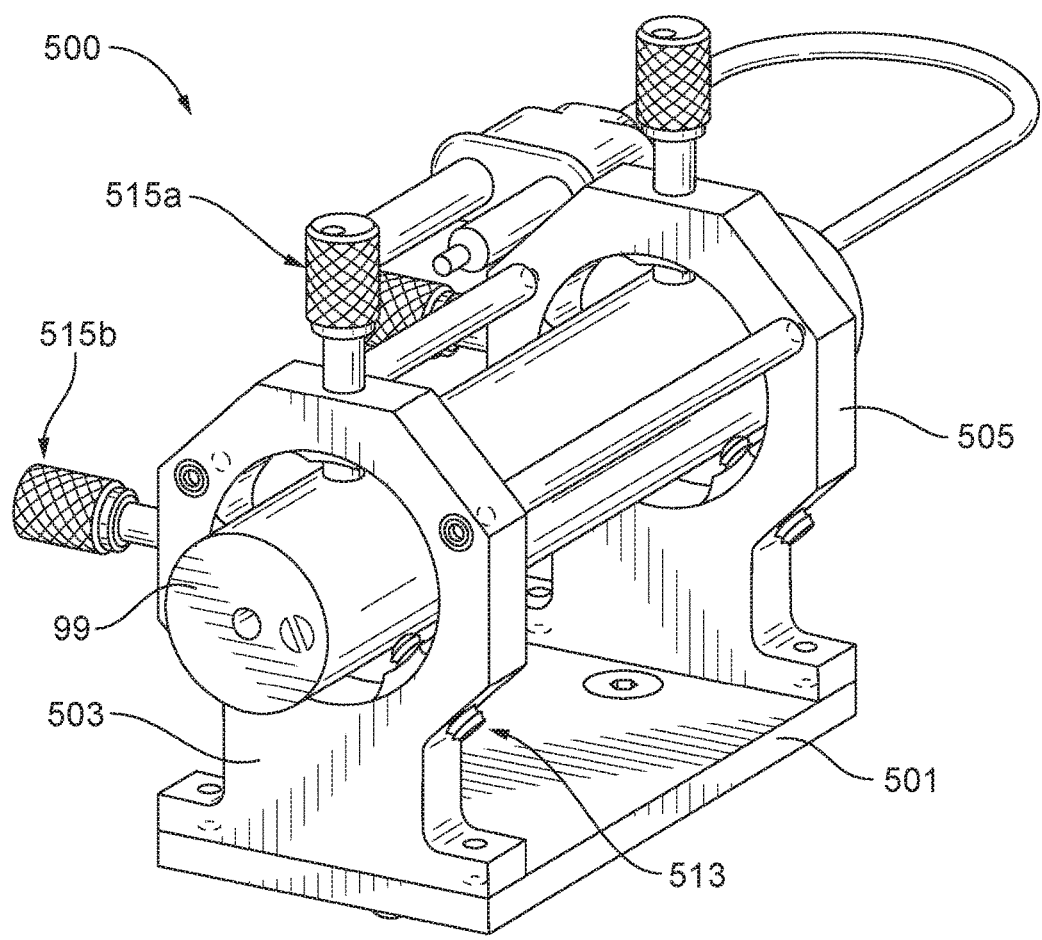
FIG. 5 is a perspective view of an embodiment of an arrangement in accordance with this disclosure.

FIG. 5 shows another embodiment of a laser alignment arrangement 500 having a first stage 503 and a second stage 505 mounted to a base 501. Each stage 503, 505 can include one or more adjustment screws 515a, 515b, or any other suitable adjustment mechanism, that contact the laser 99 to push on the laser 99. Each stage 503, 505 can include a spring plunger 513 positioned at a 135 degree angle relative to the adjustment screws 515a, 515b, which can allow the use of a single spring element, for example.

Figure 6:
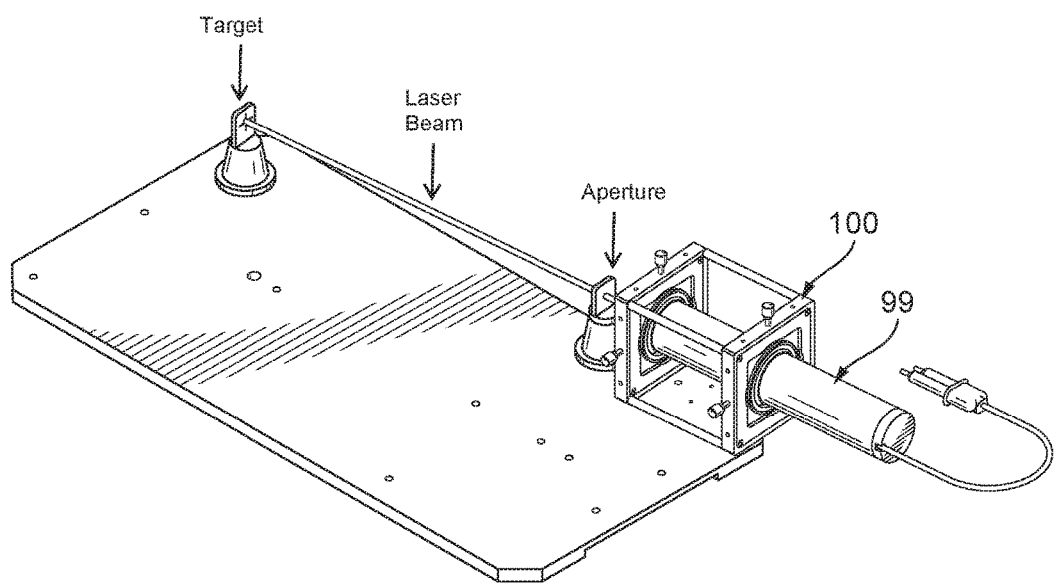
FIG. 6 is a perspective view of an assembly utilizing the arrangement of FIG. 1, shown including an aperture and target.

Laser alignment is lining the beam up so that the beam contacts the target a normal incidence angle. In certain applications, the beam is directed to hit a parabola in the center. Referring to FIG. 6, if a first aperture and a target (which can be a second aperture in certain embodiments) are at same height and position, and if the laser is centered on target and aperture, it is aligned.

As described above, embodiments allow the user to turn adjustment screws to create up/down or lateral adjustment. The swivel yoke 119 swivels forward and backward relative to the moveable housing 109 due to its semicircular outer shape, for example. Because the swivel yoke 119 is allowed to swivel, the laser 99 has the freedom to move to follow the first or second stages 103, 105. The yoke O-ring 127 allows the sliding insertion of the laser 99 through the stage and holds on to the laser which eliminates need for set screws. However, it is contemplated that any other securing mechanism (e.g., set screws), can be utilized in addition or alternatively.

To align, the user can adjust the first stage 103 to pass the beam through the aperture, then adjust the second stage 105 to allow the laser to hit the target. This process may be repeated until the laser is clearly centered through aperture and centered on the target.

This invention will allow the user to align a laser beam through an aperture and target. In this application the optical axis of a lens can be to be aligned to a parabola. The aperture and the target can be set to the optical axis of the lens. Then, the laser beam can be directed with this invention through the aperture and to the target. Once this alignment is achieved, the laser, aperture, and target can be removed and replaced by the lens, thus the lens will be set and aligned to the parabola for further testing.

The methods and systems of the present disclosure, as described above and shown in the drawings, provide for improved laser alignment systems. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A laser alignment arrangement, comprising:
a first stage configured to structurally support a laser at a first longitudinal position of the laser, the first stage being configured to adjust the first longitudinal position of the laser in at least one direction orthogonal to an axis of the laser; and
a second stage configured to structurally support the laser at a second longitudinal position of the laser, the second stage being configured to adjust the second longitudinal position of the laser in at least one direction orthogonal to the axis of the laser, wherein at least one of the first stage and the second stage include:
a fixed housing that is fixed relative to the support frame;
a moveable housing that is configured to move relative to the fixed housing, the moveable housing including a laser opening configured to receive the laser; and
a swivel yoke defining a laser opening and configured to receive the laser, the swivel yoke configured to allow articulation of the laser to prevent laser stressing between the first stage and the second stage.

2. The arrangement of claim 1, wherein the first stage is configured to adjust the first longitudinal position of the laser in two directions orthogonal to the axis of the laser, and the second stage is configured to adjust the second longitudinal position of the laser in two directions orthogonal to the axis of the laser.

3. The arrangement of claim 1, further comprising a support frame, wherein the first stage is fixed to the support frame and configured to receive the first longitudinal position of a laser and wherein the second stage is fixed to the support frame and configured to receive second longitudinal position of the laser.

4. The arrangement of claim 1, further comprising at least one spring element disposed on the fixed housing or the moveable housing to bias the moveable housing against an adjustment mechanism.

5. The arrangement of claim 4, wherein the adjustment mechanism includes at least one adjustment screw mounted to the fixed housing and configured to move relative to the fixed housing to push on the moveable housing.

6. The arrangement of claim 5, wherein the at least one spring element includes at least one spring element for each adjustment screw disposed on the fixed housing or the moveable housing on an opposite side thereof relative to each adjustment screw.

7. The arrangement of claim 6, wherein the at least one spring element for each adjustment screw includes at least two spring elements for each adjustment screw disposed on the fixed housing or the moveable housing on an opposite side thereof relative to each adjustment screw.

8. The arrangement of claim 6, wherein the first stage and the second stage are configured to move the first portion and the second portion of the laser in two axes.

9. The arrangement of claim 1, wherein the swivel yoke includes a semispherical shape and is mounted to the moveable housing via a yoke coupling assembly.

10. The arrangement of claim 9, wherein the yoke coupling assembly includes one or more O-rings retained between the swivel yoke and the moveable housing.

11. The arrangement of claim 10, wherein the one or more O-rings are made of Teflon.

12. The arrangement of claim 1, wherein the swivel yoke includes an aperture and at least one laser O-ring disposed in the aperture for interfacing with and frictionally retaining the laser.

13. The arrangement of claim 12, wherein the laser O-ring is made of silicone.

* * * * *